(12) United States Patent
Rahman et al.

(10) Patent No.: US 11,212,181 B2
(45) Date of Patent: *Dec. 28, 2021

(54) CLOUD ZONE NETWORK ANALYTICS PLATFORM

(71) Applicant: AT&T Intellectual Property I, L.P., Atlanta, GA (US)

(72) Inventors: Moshiur Rahman, Marlboro, NJ (US); Robert D. Boudreau, Jr., North Wales, PA (US); Narayan Sahoo, Ocean, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,913

(22) Filed: Jul. 13, 2020

(65) Prior Publication Data

US 2020/0344127 A1    Oct. 29, 2020

Related U.S. Application Data

(63) Continuation of application No. 16/207,702, filed on Dec. 3, 2018, now Pat. No. 10,715,391.

(51) Int. Cl.
G06F 15/173 (2006.01)
H04L 12/24 (2006.01)
H04L 12/26 (2006.01)

(52) U.S. Cl.
CPC ........ H04L 41/0893 (2013.01); H04L 41/065 (2013.01); H04L 41/0654 (2013.01); H04L 43/16 (2013.01)

(58) Field of Classification Search
CPC ............... H04L 41/0893; H04L 41/065; H04L 41/0654; H04L 43/16
See application file for complete search history.

(56) References Cited

U.S. PATENT DOCUMENTS

| | | | |
|---|---|---|---|
| 9,910,696 B2 | 3/2018 | Dow et al. | |
| 9,910,768 B1 | 3/2018 | Melekhova et al. | |
| 10,715,391 B2 * | 7/2020 | Rahman | H04L 41/0654 |
| 2016/0269442 A1 * | 9/2016 | Shieh | H04L 63/1433 |
| 2017/0034016 A1 | 2/2017 | Carroll et al. | |
| 2017/0118244 A1 * | 4/2017 | Bai | H04L 63/0263 |
| 2017/0012834 A1 | 6/2017 | Chan et al. | |
| 2017/0195386 A1 | 7/2017 | Nathan et al. | |

(Continued)

FOREIGN PATENT DOCUMENTS

WO    2017172276 A1    10/2017

*Primary Examiner* — Wing F Chan
*Assistant Examiner* — Joseph R Maniwang (57) ABSTRACT

A processing system including at least one processor may obtain first network analytics data from a plurality of zones of a telecommunication network, generate a set of policies from the first network analytics data via an apriori algorithm, where each policy in the set of policies comprises a pattern matching rule, and deploy policies of the set of policies to a plurality of edge devices in respective zones of the plurality of zones of the telecommunication network. The processing system may further receive, from at least one of the plurality of edge devices in one of the plurality of zones, a first alert of a first policy trigger of a first policy of the set of policies, and transmit a notification to a software defined network controller of the first policy trigger.

20 Claims, 4 Drawing Sheets

(56) References Cited

U.S. PATENT DOCUMENTS

| | | |
|---|---|---|
| 2017/0295181 A1 | 10/2017 | Parimi et al. |
| 2017/0353361 A1 | 12/2017 | Chopra et al. |
| 2018/0096260 A1 | 4/2018 | Zimmer et al. |
| 2018/0024868 A1 | 11/2018 | Mehta et al. |

* cited by examiner

CLOUD ZONE NETWORK ANALYTICS PLATFORM

This application is a continuation of U.S. patent application Ser. No. 16/207,702, filed on Dec. 3, 2018, now U.S. Pat. No. 10,715,391, which is herein incorporated by reference in its entirety.

The present disclosure relates generally to telecommunication network operations, and more particularly to devices, computer-readable media, and methods for deploying policies determined from network analytics data to edge devices.

BACKGROUND

Telecommunication networks may generate and collect a large volume of control plane data. For example, call detail records (CDRs) are records produced by network elements which contain details of a call (including voice calls, data sessions, e.g., email, Internet Protocol (IP) traffic, short message service (SMS) messages, and so forth) that passed through such network elements. CDRs and cause codes conform to an industry standard format. For example, each CDR comprises numerous fields containing different information or parameters. To name only a few parameters for illustration, CDR parameters may comprise a cause code, a calling party area code, a calling party phone number, a called party area code, a called party phone number, a date of a call, a time stamp for the start of a call, a time stamp for the end of a call, a time duration of a call, a type of call, a disposition of a call, and so forth. The generation, collection, and storage of CDRs and other control plane data may require significant network resources in addition to those resources that are utilized to convey actual user traffic. As such, big data approaches to network analytics may lack real-time capabilities, e.g., due to the sheer volume of data. Such approaches may also lack scalability, e.g., as a result of being customized for specific applications, e.g., lacking adaptability to adhere to time, location and specific needs of an application. In addition, virtualization of core telecommunication network components opens up numerous connectivity paths between domains that did not exist for a traditional "physical" network, thereby further increasing the complexity of network management.

SUMMARY

In one example, the present disclosure discloses a device, computer-readable medium, and method for deploying policies determined from network analytics data to edge devices. For example, a method may include a processing system including at least one processor obtaining first network analytics data from a plurality of zones of a telecommunication network, generating a set of policies from the first network analytics data via an apriori algorithm, where each policy in the set of policies comprises a pattern matching rule, and deploying policies of the set of policies to a plurality of edge devices in respective zones of the plurality of zones of the telecommunication network. The processing system may further receive, from at least one of the plurality of edge devices in one of the plurality of zones, a first alert of a first policy trigger of a first policy of the set of policies, and transmit a notification to a software defined network controller of the first policy trigger.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media and methods for deploying policies determined from network analytics data to edge devices. For instance, examples of the present disclosure provide a methodology of machine learning (ML) for cloud resource profiling and correlation, including the generation of association rules, or policies, to dynamically support safe application migration of virtual network functions via a software defined network (SDN) controller. Examples of the present disclosure support a service model under advanced cloud elasticity with dynamic safe allocation of resources for virtual machines (VMs), e.g., virtual network functions (VNFs) to handle fluctuations in demand, failure, availability, and level of service quality. For example, if it is determined that a VNF, such as a mobility virtual service control point (vSCP), has become inefficient due to the VNF/VM's health, then the present disclosure may automatically transfer the services handled by the vSCP to another VM after determining that the move to the target VM is also safe through cloud zone profiling and traffic mining results from network analytics data "at rest" or "offline," and data "in motion," e.g., "real-time" data.

In one example, network analytics data from different zones of a telecommunication network is collected in a centralized location. This may be referred to as "data at rest" or "offline data." The network analytics data may include network operational data, such as call logs, mobile device location data, control plane signaling and/or session management messages, data traffic volume records, call detail records (CDRs), error reports, network impairment records, performance logs, alarm data, and other information and statistics. In one example, the different zones (broadly "cloud zones") may identify different data centers of the telecommunication network. In one example, the cloud zones may include additional components of the telecommunication network associated with each of the data centers, e.g., without such components actually residing in the data center. For instance, radio access network (RAN) components assigned to an evolved packet core (EPC) in a data center may be deployed away from the data center but may still be considered part of the "cloud zone" in one example. In one example, the "data at rest" is partitioned by zone and is then used to build rules/policies for individual cloud zones. In one example, the data at rest is further used to build rules/policies for the overall telecommunications network. In one example, the present disclosure utilizes a rules "Apriori" algorithm with additional constraint(s) (e.g., temporal constraints and network topology constraints) to learn the rules/policies. The additional constraints may improve the accuracy of the models, correlations, and policies. In addition, the accuracy or relevancy of the input data is improved via the cloud zone data partitioning as a data pre-processing step.

In addition, the present disclosure includes a cloud tenant-based fault propagation model for individual services (such as VNFs) to validate the output accuracy of statistical association rules. For example, the zone-specific rules/policies as well as the overall network policies generated via the Apriori algorithm are then applied to real-time network analytics streams, e.g., at network virtualization edge (NVE) devices, to trigger automated action for an adaptive cloud network (e.g., a software defined network (SDN)). Before the action (such as migration of a VM from one host to another), the present disclosure may determine the current status of the target as well as the anticipated status of the target after migration using the load prediction for any time in future (based on a trend and profile analysis) and traffic demands patterns. When the anticipated status meets the needs of the network service, the VM may be transferred and/or the traffic of the VM may be transferred to a different VM providing the same or similar functions, but at a different location.

An example of the operations of the present disclosure may proceed as follows. A centralized analytics platform may collect, combine, and transform relevant operational data, and partition the aggregated data for the respective cloud zones. The centralized analytics platform may then build patterns/hidden relationships/trends and deploy these patterns as predictive rules, or "policies" for the respective zones. In one example, the patterns are learned via an Apriori algorithm, e.g., a machine learning algorithm which detects frequent patterns, or itemsets by incrementally extending subsets one element at a time. In one example, the Apriori algorithm includes temporal constraints and network topology constraints. For example, the algorithm may only consider candidate itemsets relating to network analytics data within a certain time range of each other and/or from within a certain distance/area of the telecommunication network. In another example, rules may be learned via a FP-growth (frequent pattern-growth) algorithm or a Max-Miner algorithm which may similarly detect patterns in the input data.

The rules for different zones may be deployed to edge devices in each zone, e.g., network virtualization edge (NVE) devices. For instance, in one example, NVE devices may comprise top-of-rack (TOR) servers in a rack of servers comprising host devices/network function virtualization infrastructure (NFVI) for hosting various virtual machines (VMs), e.g., virtual network functions (VNFs). In one example, the centralized analytics platform may also generate rules/policies that are applicable to all zones (and which may be deployed in all or a portion of the zones), or which may be applicable to collective network analytics data from a centralized view that may not be available to individual zones (and which may therefore be deployed at the centralized network analytics platform itself).

In one example, each of the edge devices implements the rules/policies from the centralized network analytics platform in an edge analytics module operating on the edge device. In particular, the edge devices (e.g., NVE devices) obtain network analytics data from the devices (e.g., NFVI/host devices and/or the VMs/VNFs operating thereon) within the respective portions of the respective zones in which the edge devices are deployed and may apply the rules/policies to the network analytics data to detect any pattern matches, e.g., rules triggers. A rule trigger may indicate an anomaly regarding a VM/VNF, such as a failure condition, an overload condition, a degraded performance condition, etc.

In accordance with the present disclosure, when it is determined from a rule trigger that a VM/VNF, such as a vSCP has become inefficient or unavailable, has failed, etc., the edge device may notify the centralized network analytics platform. The centralized network analytics platform may then notify an SDN controller of the telecommunication network of the rule trigger. In turn, the SDN controller may take appropriate action, such as migration to a "safe" VM in a "safe" network location. In one example, the centralized network analytics platform may maintain overall status information for each zone of the network (e.g., derived from the "data at rest" collected by the centralized network analytics platform). Accordingly, in one example, the centralized network analytics platform may also notify the SDN controller of the statuses of different zones. For instance, if the SDN controller is configured to migrate the VM/VNF to another host in another cloud zone in response to a notification of an anomaly relating to the VM/VNF, the SDN controller may exclude from consideration for transfer any of the zones indicated by the centralized network analytics platform as having statuses that would indicate that the zone(s) cannot accept new VMs, are overloaded and should be avoided, etc.

However, since the centralized network analytics platform maintains zone status information based upon collected data (e.g., "data at rest"). The view of the centralized network analytics platform may still be inaccurate in fast changing scenarios. Thus, in one example, the SDN controller may first identify a candidate host device/NFVI and/or a candidate VM/VNF to transfer traffic for the VM/VNF experiencing the anomaly. The SDN controller may then check for the target VM's health using a health probe to query a zone agent in the zone of the target VM. For instance, each zone may include at least one zone agent that is responsible for VMs in a portion of the zone assigned to the at least one zone agent. In various examples, a zone may have a single agent for the entire zone, may have a zone agent for several racks in a data center, each rack may have a designated zone agent, and so forth. In one example, a single zone agent may be associated with a greater number of devices (e.g., NFVI and/or VMs) than a single edge device (e.g. a NVE) discussed above. The zone agent may maintain status information for each VM and/or NFVI for which it is responsible. The zone agent may also receive and respond to queries from the SDN controller regarding various NFVI and/or VMs. For instance, the status information for NFVI, e.g., a server or blade in a rack, may include: whether the NFVI is powered on, whether any VMs are operating thereon, the number of VMs operating thereon, the number of processors, the capacity of the processors, the current processor load(s), the memory capacity, the memory in use and/or the amount of free memory available, the number of transceivers or ports, the number of available transceivers or ports, the speed of such transceivers, and so forth. VM status information may include an amount of memory assigned, an amount of memory in use, a processor utilization, a processor availability, a number of packets received, a number of packets sent, and so on. As such, the SDN controller may query the zone agent to determine that the target VM (or NFVI to host the VM) is capable of handling the intended traffic. Thus, the SDN controller may learn the current health of the target VM, host, and the cloud zone, the future load prediction (based on the trend and profile analysis) and traffic demands patterns. When the move is determined to be safe, the SDN controller executes and takes the recommended action (e.g., transferring the VM and/or the traffic of the VM experiencing the anomaly to the new and/or different VM. It should be noted that the VM, or the traffic for the VM may be transferred to a new and/or different VM in a same cloud zone or a different cloud zone. In either case, the redundancy of the zone status provided by the centralized network analytics platform and the VM/NFVI health status obtained from the zone agent ensures that the migration is proper.

In one example, the available volume of network analytics data for certain VNFs or types of VNFs may be insufficient. In this instance, the present disclosure may utilize network analytics data of non-VNF counterparts (e.g., network analytics data pertaining to SCPs instead of vSCPs) to learn patterns and build rules/policies which may then be applied at the edge devices to monitor the respective VNFs. In addition, network analytics data may continue to be gathered for the virtual machine components and the rules/policies may continue to be trained and updated as VNF deployment increases. In one example, network analytics data from both virtual and non-virtual components may be blended back to address hybrid network impacting use cases.

Examples of the present disclosure thus provide a new cloud network capability with accurate correlation rules, close-loop action accuracy, open loop ticket reduction with improved correlation, and seamless service continuity. VMs are independently monitored to flag exceptions/anomalies. A machine-learning algorithm (e.g., Apriori algorithm with time and network topology constraints) will initially create the normal state status of each VM, and then continuously update the normal state as time passes. In addition, edge devices may compare new network analytics data to the pre-calculated steady state looking for out of bounds conditions or anomalies. An anomaly will trigger an alert identifying the condition causing the anomaly to accelerate corrective measures. These and other aspects of the present disclosure are discussed in greater detail below in connection with the examples of FIGS. 1-4.

Figure 1:
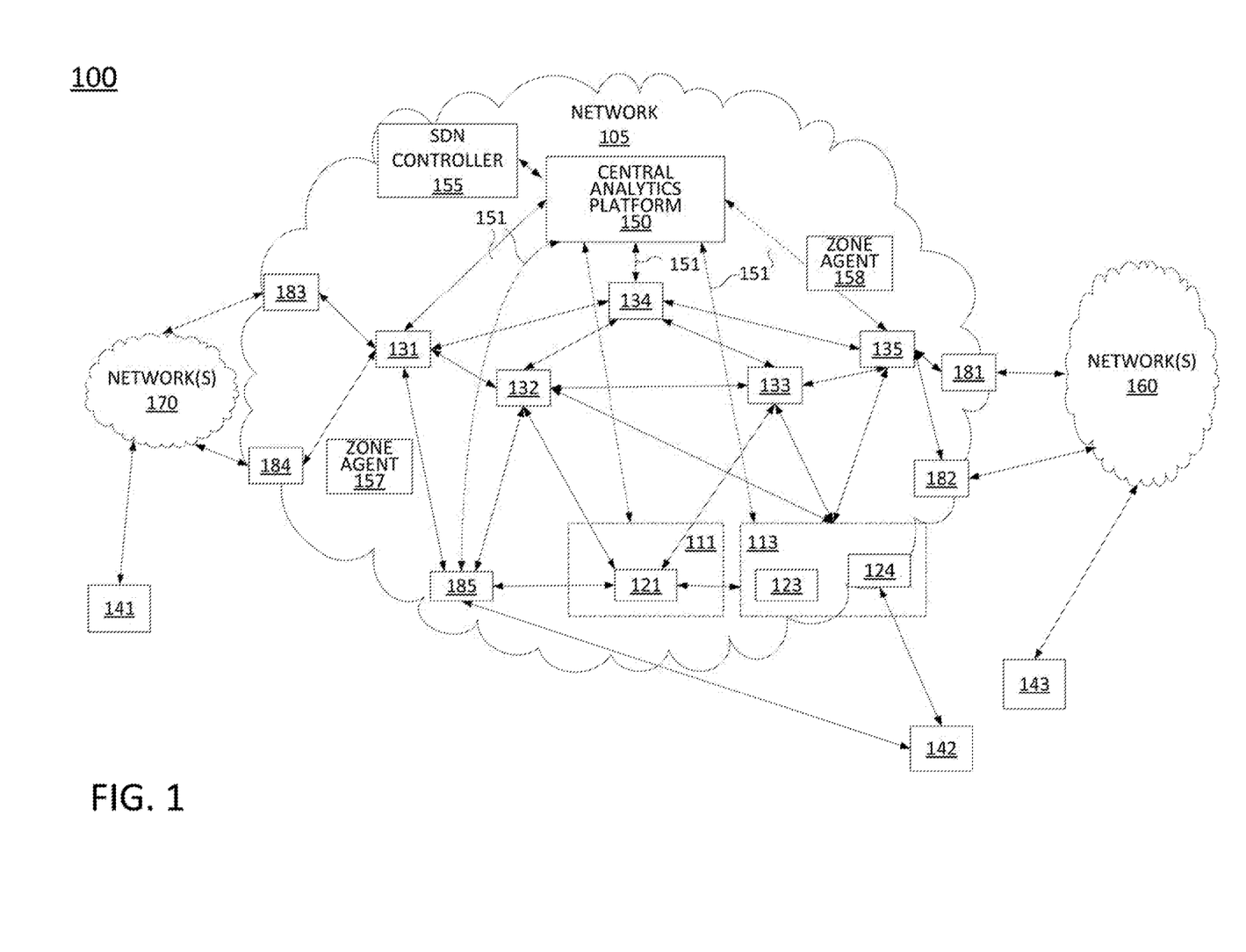
FIG. 1 illustrates an example system related to the present disclosure.

To aid in understanding the present disclosure, FIG. 1 illustrates a block diagram depicting one example of a communications network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) comprising virtual network functions (VNFs). In other words, at least a portion of the network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks. In addition, as used herein, the terms "configured" and "reconfigured" may refer to programming or loading a computing device with computer-readable/computer-executable instructions, code, and/or programs, e.g., in a memory, which when executed by a processor of the computing device, may cause the computing device to perform various functions.

In one example, the network 105 may be in communication with networks 160 and networks 170. Networks 160 and 170 may comprise wireless networks (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. User devices 141-143 may comprise, for example, cellular telephones, smart phones, personal computers, other wireless and wired computing devices, private branch exchanges, customer edge (CE) routers, media terminal adapters, cable boxes, home gateways and/or routers, and so forth.

In accordance with the present disclosure, user devices 141-143 may access network 105 in various ways. For example, user device 141 may comprise a cellular telephone which may connect to network 105 via network 170, e.g., a cellular access network. For instance, such an example network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a domain name service (DNS) server, a packet data network gateway (PGW), a gateway mobile switching center (GMSC), a short message service center (SMSC), etc.

Figure 4:
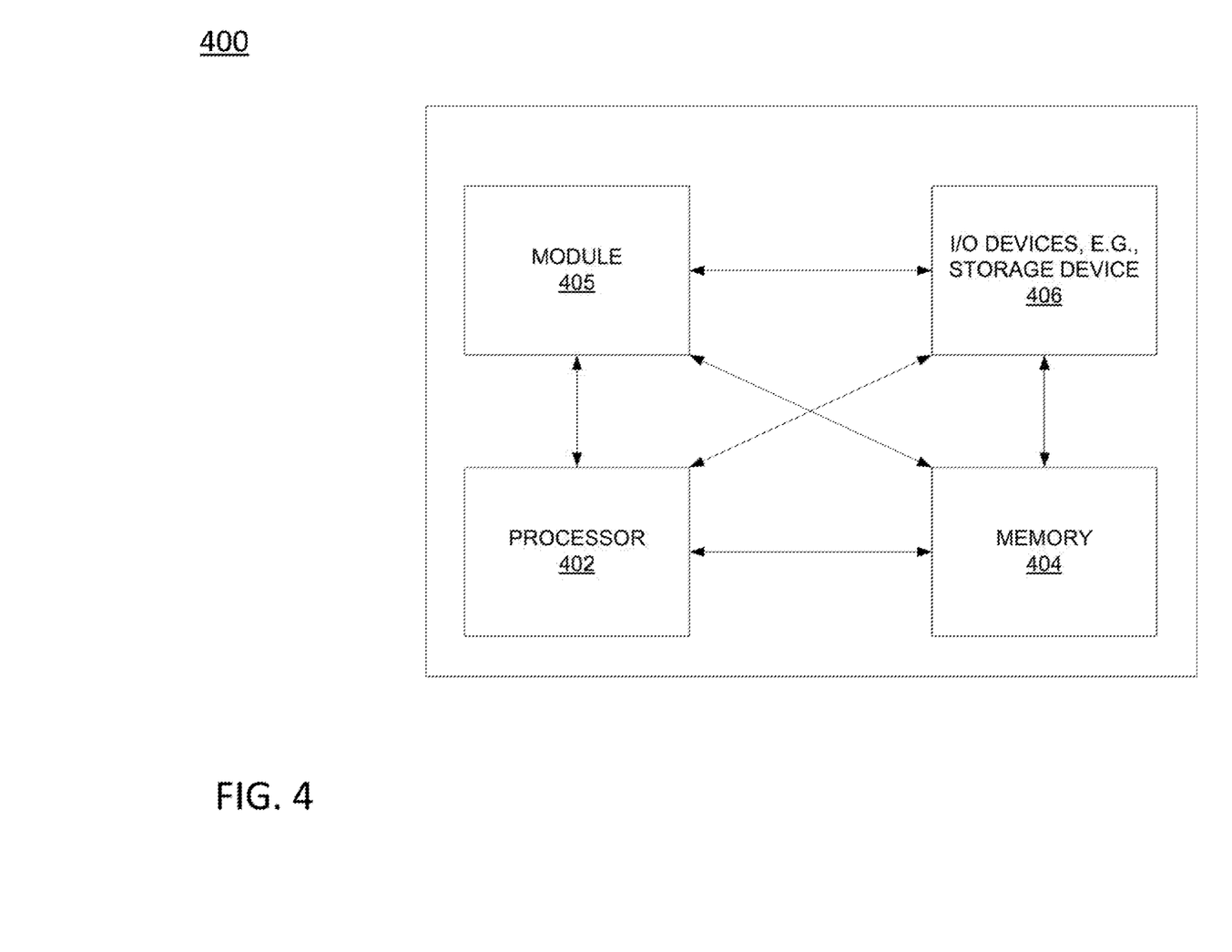
FIG. 4 illustrates an example high-level block diagram of a computing device specifically programmed to perform the steps, functions, blocks, and/or operations described herein.

As further illustrated in FIG. 1, network 105 includes a software defined network (SDN) controller 155. In one example, the SDN controller 155 may comprise a computing system or server, such as computing system 400 depicted in FIG. 4, and may be configured to provide one or more operations or functions in connection with examples of the present disclosure for deploying policies determined from network analytics data to edge devices. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 4 and discussed below) or multiple computing devices collectively configured to perform various steps, functions, and/or operations in accordance with the present disclosure.

In one example, NFVI 111 and unit 121, and NFVI 113 and units 123 and 124 may be controlled and managed by the SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may comprise secure tunnels for signaling communications over an underling IP infrastructure of network 105. In other words, the control links may comprise virtual links multiplexed with transmission traffic and other data traversing network 105 and carried over a shared set of physical links. For ease of illustration the control links are omitted from FIG. 1. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

The functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SDN controller 155 via additional control links. However, at least a portion of the internal nodes 131-135 may comprise dedicated devices or components, e.g., non-SDN reconfigurable devices.

Similarly, network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers interfacing with network(s) 170, e.g., for non-cellular network-based communications. In one example, components 181-185 may also comprise VNFs hosted by and operating on additional NFVI. However, in another example, at least a portion of the components 181-185 may comprise dedicated devices or components.

Zone agents 157 and 158 may reside within network 105 and may be made available to SDN controller 155 for performing various functions in connection with examples of the present disclosure for deploying policies determined from network analytics data to edge devices. In one example, the zone agents 157 and 158 may each comprise a computing system or server, such as computing system 400 depicted in FIG. 4, and may be configured to provide one or more functions for deploying policies determined from network analytics data to edge devices, as described herein. For ease of illustration, various links between zone agents 157 and 158, and SDN controller 155, and other links for zone agents 157 and 158, and SDN controller 155 to communicate with other components are omitted from FIG. 1. In one example, SDN controller 155 may monitor the health/status of various internal nodes 131-135 or components 181-185 assigned to different "zones" and may instantiate, tear down, configure and reconfigure various VMs/VNFs of nodes 131-135 or components 181-185 via zone agents 157 and 158. For instance, in one example, nodes 131, 132, and 134, components 183-185, unit 121 and/or NFVI 111 may be assigned to a first zone associated with zone agent 157, while nodes 133 and 135, components 181 and 182, and units 123 and 124 and/or NFVI 113 may be assigned to a second zone associated with zone agent 158.

In one example, network 105 further includes a central analytics platform 150. The central analytics platform 150 may comprise a computing system or server, such as computing system 400 depicted in FIG. 4, and may be configured to provide one or more operations or functions in connection with examples of the present disclosure for deploying policies determined from network analytics data to edge devices. For instance, central analytics platform 150 may obtain network analytics data from different "zones" of the network 105, generate a set of policies from the network analytics data via an apriori algorithm, where each policy in the set of policies comprises a pattern matching rule, and deploy policies of the set of policies to edge devices in respective zones of the network 105. The central analytics platform 150 may further receive, from at least one of the edge devices in one of the zones, an alert of a policy trigger of one of the policies, transmit a notification to SDN controller 155 of the policy trigger, and so forth. The edge devices may comprise network virtualization edge (NVE) devices, which may be represented by any one or more of internal nodes 131-135 or components 181-185, in FIG. 1. In one example, the edge devices may be associated with one of the "zones" mentioned above in connection with zone agents 157 and 158.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, zone agents 157 and 158 may be integrated into host device(s)/NFVI. In still another example, SDN controller 155, central analytics platform 150, zone agents 157 and 158, and/or other network elements may comprise functions that are spread across several devices that operate collectively as a SDN controller, a central analytics platform, an edge device, a zone agent, etc. Thus, these and other modifications of the system 100 are all contemplated within the scope of the present disclosure.

Figure 2:
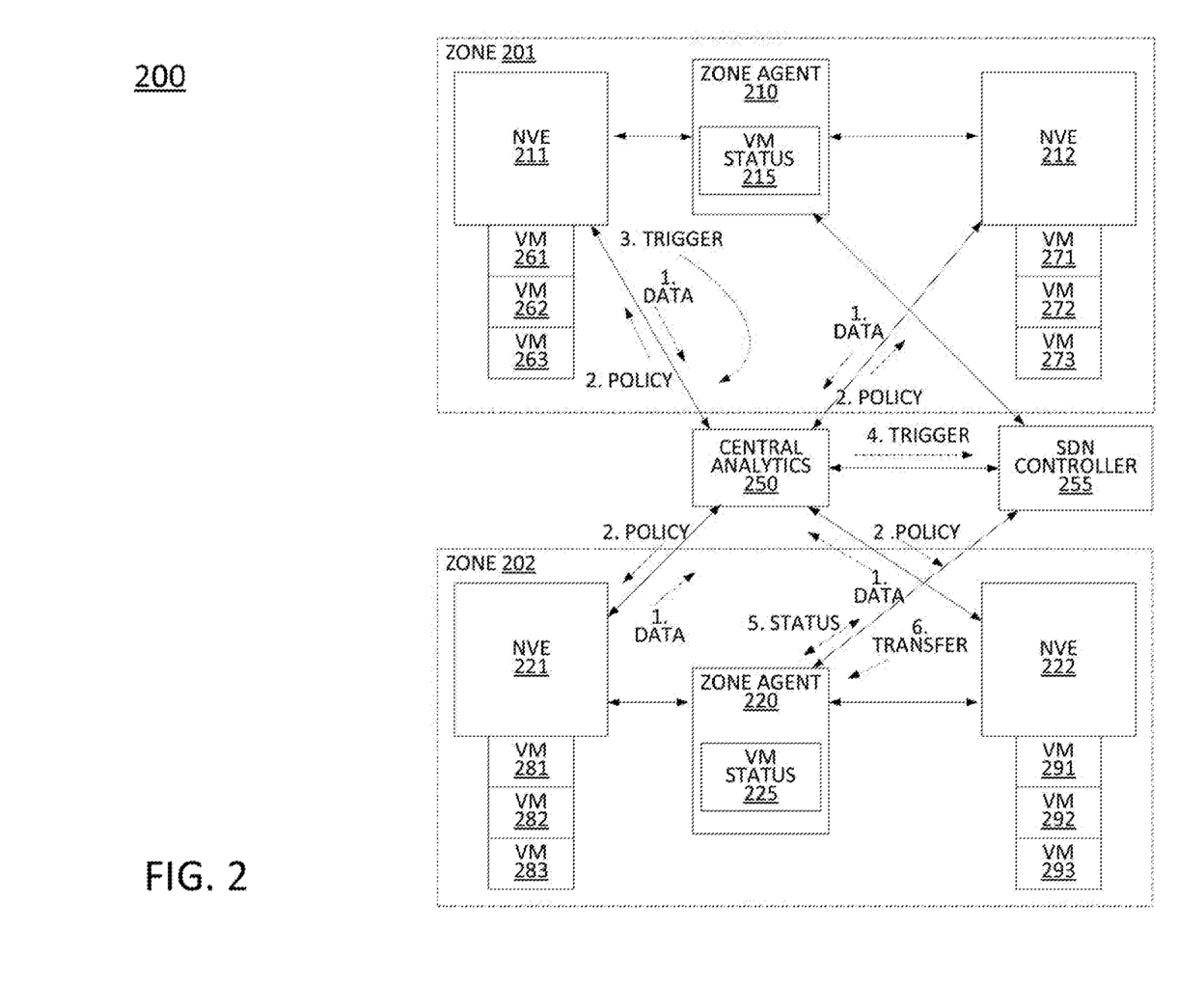
FIG. 2 illustrates an example network related to the present disclosure.

FIG. 2 illustrates an example network 200 in which examples of the present disclosure for deploying policies determined from network analytics data to edge devices may operate. As illustrated in FIG. 2, the network 200 includes a central analytics platform 250, an SDN controller 255, and zone agents 210 and 220. These components may be the same as or similar to the central analytics platform 150, SDN controller 155, and zone agents 157 and 158 of the system 100 of FIG. 1. As further illustrated in FIG. 2, the network 200 includes two zones: zone 201 associated with zone agent 210 and zone 202 associated with zone agent 220. In one example, each of zones 201 and 202 may correspond to a different network data center. Zone 201 includes network virtualization edge (NVE) devices 211 and 212. Zone 202 includes NVE devices 221 and 222. In one example, NVE devices 211, 212, 221, and 222 may each comprise a top-of-rack (ToR) server, where each rack may include any number of servers/blades. The servers/blades may comprise NFVI/host devices for hosting various virtual machines (VMs), e.g., virtual network functions (VNFs) or may comprise dedicated hardware devices for performing various network functions. However, for illustrative purposes, it is assumed that VMs are being hosted thereon. In the present example, NVE device 211 may be responsible for VMs 261-263, NVE device 212 may be responsible for VMs 271-273, NVE device 221 may be responsible for VMs 281-283, and NVE device 222 may be responsible for VMs 291-293.

FIG. 2 also includes arrows 1-6 corresponding to a sequence of operations, or stages, illustrative of one example of the present disclosure. For instance, in accordance with the present disclosure, NVEs 211, 212, 221, and 222 may be configured to collect network analytics data from VMs and to forward the network analytics data, represented by arrows labeled "1" indicating the flow of data, to central analytics platform 250. The central analytics platform 250 may segregate the network analytics data by zones (e.g., for zones 201 and 202) and may apply the Apriori algorithm as described above to determine association rules and corresponding actions. Central analytics platform 250 may then deploy the association rules as zone-specific policies to the respective NVE devices 211, 212, 221, and 222, represented by arrows labeled "2." Notably, the zone-specific policies provided for NVE device 211 may be adapted to VMs 261-263 individually, or may be collectively applicable to VMs 261-263, while the zone-specific policies provided for NVE device 212 may be adapted to VMs 271-273 individually, or may be collectively applicable to VMs 271-273, and similarly for the zone-specific policies provided for NVE devices 221 and 222.

NVE devices 211, 212, 221, and 222 may then apply the respective zone-specific policies to new network analytics data collected by the respective NVE devices 211, 212, 221, and 222 to detect patterns in the network analytics data matching the zone-specific policies or which may be out-of-bounds of the zone-specific policies (e.g., indicating anomalous network analytics data). For instance, in an illustrative example, NVE 211 may collect network analytics data from VMs 261-263, from the host device(s) on which VMs 261-263 reside, and so forth. In addition, NVE 211 may detect a "policy trigger" for one of the zone-specific policies. For instance, when applying the zone-specific policies to the network analytics data, NVE 211 may detect anomalous network analytics data for VM 262. For instance, the VM may be overloaded. In such case, NVE 211 may notify the central analytics platform 250 of the policy trigger, indicated by arrow "3." In one example, the notification may include the identification of the VM 262, a host device on which VM 262 is operating, and/or additional information. It should also be noted that NVEs 211, 212, 221, and 222 may also forward gathered network analytics data, e.g., in a raw format, in a summary format, in an aggregated format, etc. to central analytics platform 250 on an ongoing basis and independent from any policy trigger notifications. In one example, central analytics platform 250 may utilize the gathered network analytics data to generate and store zone status information of the zones 201 and 202.

In response to receiving notification of the policy trigger, central analytics platform 250 may identify a type of event for the policy trigger, e.g., a failed vSCP, on overloaded virtual mobility management entity (vMME), etc. Alternatively, or in addition, central analytics platform 250 may also apply network-wide policies to network analytics data obtained from NVEs 211, 212, 221, and 222. Accordingly, in one example, central analytics platform 250 may also correlate any policy triggers of network-wide policies which may be associated with the policy trigger of which the central analytics platform 250 receives the notification from NVE 211, e.g., to identify a root cause, which may be external to zone 201 and/or a portion of zone 201 assigned to NVE 211. In one example, central analytics platform 250 may aggregate policy trigger notifications from respective zones 201 and 202 to provide zone status information. For instance, if more than a first threshold number of VMs are experiencing anomalies in zone 201 (as indicated by policy trigger notifications received by central analytics platform 250), then central analytics platform 250 may determine that zone 201 is in a "questionable" state. If more than a second threshold number of VMs are experiencing anomalies in zone 201 (as indicated by policy trigger notifications received by central analytics platform 250), then central analytics platform 250 may determine that zone 201 is in a "critical" state, and so forth. It should be noted that zone status information may be generated from the policy trigger notification, from network-wide policies applied to network analytics data by central analytics platform 250, or both.

Next, central analytics platform 250 may transmit a notification of the policy trigger to SDN controller 255, indicated by arrow "4." In one example, the notification may comprise the same information in the notification received from NVE 211. In one example, central analytics platform 250 may also include any additional information of relevance that is collected by the central analytics platform 250, e.g., an affected VM, a type of event, root cause information, correlated network-wide policy triggers, etc. In addition, central analytics platform 250 may also include zone status information of various zones of the network 200. In response, SDN controller 255 may then attempt to implement one or more remedial actions to address the event. For instance, SDN controller 255 may attempt to migrate the VM 262 to a different host device in zone 201 or a different zone, e.g., zone 202. Alternatively, or in addition SDN controller 255 may attempt to migrate traffic for VM 262 to a different VM in a same or a different zone. For instance, a plurality of VMs may already be configured and deployed to perform the same or similar operations in a load-balancing arrangement. However, in a current configuration, VM 262 may be assigned a percentage "X" of the traffic load, whereas SDN controller 255 may seek to reassign the percentage "X" to one or more other peer VMs.

In accordance with the present disclosure, SDN controller 255 may first select one or more candidate VMs to handle the traffic load of VM 262. Notably, SDN controller 255 may consult the zone status information obtained from central analytics platform 250 to select a candidate VM (or several candidate VMs) in a zone that is not in a negative status or having a status level above a threshold (e.g., not having a status of "questionable," "critical," "offline," "restricted," etc.). However, in one example, even where the zone status information appears to indicate that there are no potential problems (e.g., status of "normal," "no reported events," "low traffic load," or the like), SDN controller 255 may still perform a status verification. For instance, the zone status information from central analytics platform 250 may be stale since central analytics platform 250 may be applying network-wide policies to network analytics data that may have some time lag from a time when collected by NVE devices 211, 212, 221, and 222. In other words, central analytics platform 250 may have an inaccurate or not up-to-date view of the statuses of the respective zones 201 and 202. In one example, the status verification may be sent to a zone agent.

For instance, SDN controller may identify VM 291 as a candidate to transfer VM 262 and/or the traffic load of VM 262.

In such an example, the status verification may be requested from zone agent 220. To illustrate, zone agent 220 may maintain a set of VM status records 225 for VMs 281-283 and 291-293 in zone 202. The VM status records 225 may include an amount of memory assigned, an amount of memory in use, a processor utilization, a processor availability, a number of packets received, a number of packets sent, and so on. The VM status records 215 and 225 maintained by zone agents 210 and 220 respectively, may include information that is the same as or at least partially overlaps with the network analytics data gathered by NVE devices 211, 212, 221, and 222. Thus, connections between NVE devices 211, 212, 221, and 222, and zone agents 210 and 220 are illustrated in FIG. 2. However, as an alternative, or in addition, in one example, zone agents 210 and 220 may communicate directly with VMs 261-263, 271-273, 281-283, and 291-293 respectively. In any event, zone agent 220 may respond to SDN controller 255 with the status information of the candidate VM 291.

It should also be noted that in one example, SDN controller 255 may similarly query NFVI/host status information and zone agent 220 may similarly maintain, store, and provide such information upon request. However, for illustrative purposes, it is assumed that just VM status information is included in the request and response. The status verification request from SDN controller 255 and response from zone agent 220 are indicated by the double-ended arrow "5." In response to determining that the status of VM 291 is acceptable, SDN controller 255 may then initiate a transfer (e.g., of VM 262 to VM 291, and/or a transfer of the traffic load of VM 261 to VM 291). To illustrate, SDN controller 255 may transmit an instruction to zone agent 220, indicated by arrow "6," to configure VM 291 accordingly. For instance, code, instructions, or the like may be loaded onto a host device/NFVI to configure VM 291 to operate as a vSCP.

It should be noted that the operations 1-6 are illustrative in nature, and that other, further, and/or different operations may alternatively or additionally be performed. As just one example, SDN controller 255 may also engage zone agent 220 and/or another zone agent to configure or reconfigure other components of network 200 (e.g., other VMs) to change a traffic routing. For instance, other VMs configured to feed VM 262 with a certain amount of network traffic may instead be configured to route such network traffic to VM 291. In one example, SDN controller 255 may instruct zone agent 210 to release VM 262, e.g., to make the resources of VM 262 available for re-assignment to another network function, to power-down resources associated with VM 262, etc. Thus, these and other modifications are all contemplated within the scope of the present disclosure.

Figure 3:
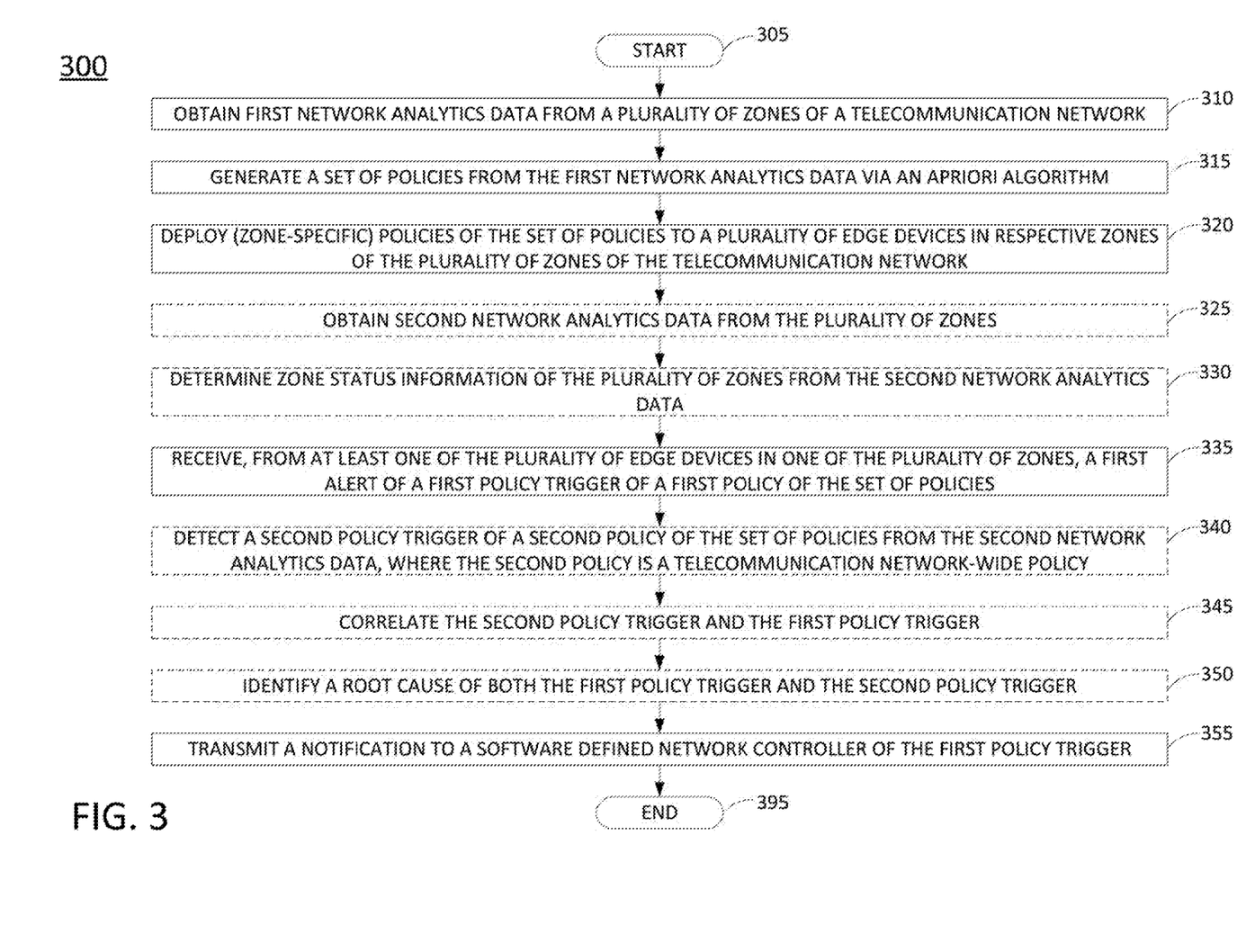
FIG. 3 illustrates a flowchart of an example method for deploying policies determined from network analytics data to edge devices.

FIG. 3 illustrates a flowchart of an example method 300 for deploying policies determined from network analytics data to edge devices, in accordance with the present disclosure. In one example, the method 300 is performed by a component of the system 100 of FIG. 1, such as by central analytics platform 150, and/or any one or more components thereof (e.g., a processor, or processors, performing operations stored in and loaded from a memory), or by central analytics platform 150, in conjunction with one or more other devices, such as SDN controller 155, zone agents 157 and 158, and so forth. In one example, the method 300 is performed by the same or a similar component, or components, of the network 200 of FIG. 2. In one example, the steps, functions, or operations of method 300 may be performed by a computing device or system 400, and/or processor 402 as described in connection with FIG. 4 below. For instance, the computing device or system 400 may represent any one or more components of central analytics platform 150, SDN controller 155, etc. in FIG. 1, and/or central analytics platform 250, SDN controller 255, zone agents 210 and 220, NVE devices 211, 212, 221, and 222, etc. in FIG. 2, that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system obtains first network analytics data from a plurality of zones of a telecommunication network. The first network analytics data may be obtained from a plurality of devices in the telecommunication network, such as virtual machines, host devices, network virtualization edge (NVE) devices, and so forth. In one example, the NVE devices can aggregate and pass up/pass through the network analytics data from the VMs or host devices. In one example, the first network analytics data may include network operational data, such as call logs, mobile device location data, control plane signaling and/or session management messages, data traffic volume records, call detail records (CDRs), error reports, network impairment records, performance logs, alarm data, and other information and statistics.

At step 315, the processing system generates a set of policies from the first network analytics data via an Apriori algorithm, where each policy in the set of policies comprises a pattern matching rule. In one example, the set of policies includes zone-specific policies and telecommunication network-wide policies. In one example, the Apriori algorithm is applied with temporal constraints and network topology constraints as described above.

At step 320, the processing system deploys policies of the set of policies to a plurality of edge devices in respective zones of the plurality of zones of the telecommunication network, e.g., network virtualization edge (NVE) devices. For instance, in one example, the policies of the set of policies that are deployed to the plurality of edge devices may comprise the zone-specific policies generated at step 315. It should be noted that in one example, the processing system deploys the telecommunication network-wide policies. In another example, the processing system may deploy the telecommunication network-wide policies to another centralized component of the telecommunication network.

At optional step 325, the processing system may obtain second network analytics data from the plurality of zones of the telecommunication network. The second network analytics data may comprise the same type(s) of data as the first network analytics data, and may come from the same sources as the first network analytics data mentioned above in connection with step 310, from different sources, or both.

At optional step 330, the processing system may determine zone status information of the plurality of zones from the second network analytics data, e.g., metrics for the overall health of each respective zone. For instance, the zone status information may comprise negative statuses of "questionable," "critical," "offline," "restricted," or the like, positive statuses of "normal," "no reported events," "low traffic load," or the like, and so forth. In one example, the zone status information of a zone may be further computed in accordance with any rule/policy trigger notifications received with respect to VMs and/or other components within the zone within a given time period (e.g., the current time period).

At step 335, the processing system receives, from at least one of the plurality of edge devices in one of the plurality of zones, a first alert of a first policy trigger of a first policy of the set of policies. For instance, the first policy trigger of the first policy of the set of policies may be detected by the at least one of the plurality of edge devices in accordance with the second network analytics data (e.g., the portion of the second network analytics data that is of/from the particular portion of the zone of the network associated with the at least one of the plurality of edge devices). For instance, the second network analytics may match to a pattern of the first policy or may be out-of-bounds of a pattern of the first policy, thereby indicating an anomaly, e.g., anomaly regarding a VM/VNF, such as a failure condition, an overload condition, a degraded performance condition, etc.

It should be noted that in one example, the first network analytics data obtained at step 310 may include analytics data from non-virtual network components of the telecommunication network. In addition, in such an example, each policy of the set of policies may be associated with a respective one of the plurality of zones of the telecommunication network and a network component type, where the first alert of the first policy trigger of the first policy of the set of policies is associated with a virtual machine of one of the network component types in the one of the plurality of zones. In other words, the processing system may adapt or bootstrap policies/association rules for VMs from network analytics data from non-virtual components, e.g., when there may be insufficient data available from VMs with which to generate policies/rules.

At optional step 340, the processing system may detect a second policy trigger of a second policy of the set of policies from the second network analytics data. For instance, the second policy may be one of the telecommunication network-wide policies that is applied by the processing system to the second network analytics data.

At optional step 345, the processing system may correlate the second policy trigger and the first policy trigger. For instance, the first and second policy triggers may be associated, or correlated with one another when the policy triggers are close in time, when the second policy trigger is specific enough to identify the same VM, the same zone, or the same portion of the zone associated with the at least the first edge device, and so on. In one example, the first and second policy triggers may have an association that is learned over time, e.g., via an automated machine learning or through human-based intelligence from analysis of past events. For instance, an anomaly relating to a packet data network gateway (PGW) may be known to be associated with an anomaly relating to a content distribution network (CDN) for video streaming over cellular. Thus, a first policy trigger relating to a virtual PGW in a first zone may also be identified as being correlated to the second policy trigger relating to delivery failures regarding the CDN, which may be visible and identifiable from the overall network view of the processing system implementing the second policy (and which may not be detectable at the zone level, or from the perspective of the network edge device implementing the first policy).

At optional step 350, the processing system may identify a root cause of both the first policy trigger and the second policy trigger. For instance, in the example above, the root cause may be the failure of the vPGW. However, in another example, a network service may involve a number of network functions (e.g., virtual, non-virtual, or both) collectively operating to perform the network service. A failure of any one of the components may affect the functioning of other components, e.g., those which may be downstream within a flow of network traffic. As such, the processing system, which is centralized and which may be receiving network analytics data from all zones, may identify a root cause as being a failure of an upstream component in a different zone and/or a different portion of a zone from which the notification of the first policy trigger is received. For instance, the failure of the upstream component may be detected via the second policy trigger.

At step 355, the processing system transmits a notification to a software defined network controller of the first policy trigger. In one example, the notifying of the software defined network controller includes an identification of the root cause identified at optional step 350. In one example, the notification includes the zone status information of other zones of the plurality of zones determined at optional step 330. In one example, the software defined network controller performs at least one remedial action in response to the notification of the first policy trigger (and any additional information included with the notification). For instance, the first policy trigger may identify at least a first virtual machine associated with the at least one of the plurality of edge devices and the at least one remedial action may comprise at least one of: instantiating at least a second virtual machine to replace the at least the first virtual machine for a network service, or redirecting traffic of the network service for the at least the first virtual machine to the at least the second virtual machine.

In one example, the at least the second virtual machine is instantiated by the software defined network controller in another zone of the plurality of zone from a zone of the at least the first virtual machine. In this regard, in one example, the software defined network controller verifies the zone status information of the other zones from a plurality of zone agents, where each of the other zones includes at least one of the plurality of zone agents. For example, each of the plurality of zone agents may monitor status information for a plurality of virtual machines and a plurality of host devices of a respective zone of the plurality of zones.

Following step 355, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300, such as steps 335-355, and so forth. In another example, the method 300 may update the set of policies periodically and/or on an ongoing basis. For instance, steps 310-320 may be repeated with respect to the second network analytics data and/or additional network analytics data, and so forth. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for deploying policies determined from network analytics data to edge devices, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for deploying policies determined from network analytics data to edge devices (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for deploying policies determined from network analytics data to edge devices (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, first network analytics data from a plurality of zones of a telecommunication network;
generating, by the processing system, a set of policies from the first network analytics data via a machine-learning algorithm, wherein each policy in the set of policies comprises a pattern matching rule;
deploying, by the processing system, at least one policy of the set of policies to a plurality of edge devices in respective zones of the plurality of zones of the telecommunication network;
receiving, by the processing system from at least one of the plurality of edge devices in one of the plurality of zones, a first alert of a first policy trigger of a first policy of the set of policies; and
transmitting, by the processing system, a notification to a software defined network controller of the first policy trigger.

2. The method of claim 1, wherein the set of policies includes zone-specific policies and telecommunication network-wide policies.

3. The method of claim 2, wherein the at least one policy of the set of policies that is deployed to the plurality of edge devices comprises the zone-specific policies.

4. The method of claim 3, wherein the processing system deploys the telecommunication network-wide policies.

5. The method of claim 4, further comprising:
obtaining second network analytics data from the plurality of zones of the telecommunication network.

6. The method of claim 5, wherein the first policy trigger of the first policy of the set of policies is detected by the at least one of the plurality of edge devices in accordance with the second network analytics data.

7. The method of claim 5, further comprising:
detecting a second policy trigger of a second policy of the set of policies from the second network analytics data, where the second policy is one of the telecommunication network-wide policies;
correlating the second policy trigger and the first policy trigger; and
identifying a root cause of both the first policy trigger and the second policy trigger.

8. The method of claim 7, wherein the notification to the software defined network controller includes an identification of the root cause.

9. The method of claim 5, further comprising:
determining zone status information of the plurality of zones from the second network analytics data.

10. The method of claim 9, wherein the notification includes the zone status information of other zones of the plurality of zones.

11. The method of claim 10, wherein the software defined network controller verifies the zone status information of the other zones from a plurality of zone agents, wherein each of the other zones includes at least one of the plurality of zone agents.

12. The method of claim 11, wherein each of the plurality of zone agents monitors status information for a plurality of virtual machines and a plurality of host devices of a respective zone of the plurality of zones.

13. The method of claim 1, wherein the software defined network controller performs at least one remedial action in response to the notification of the first policy trigger.

14. The method of claim 13, wherein the first policy trigger identifies at least a first virtual machine associated with the at least one of the plurality of edge devices.

15. The method of claim 14, wherein the at least one remedial action comprises at least one of:
instantiating at least a second virtual machine to replace the at least the first virtual machine for a network service; or
redirecting traffic of the network service for the at least the first virtual machine to the at least the second virtual machine.

16. The method of claim 15, wherein the at least the second virtual machine is instantiated by the software defined network controller in another zone of the plurality of zones from a zone of the at least the first virtual machine.

17. The method of claim 1, wherein the first network analytics data is obtained from a plurality of devices in the telecommunication network, wherein the plurality of devices includes at least one of:
virtual machines;
host devices; or
network virtualization edge devices.

18. The method of claim 1, wherein the first network analytics data includes analytics data from non-virtual network components of the telecommunication network, wherein each policy of the set of policies is associated with a respective one of the plurality of zones of the telecommunication network and a network component type, and wherein the first alert of the first policy trigger of the first policy of the set of policies is associated with a virtual machine of one of the network component types in the one of the plurality of zones.

19. A non-transitory computer-readable medium storing instructions which, when executed by a processing system including at least one processor, cause the processing system to perform operations, the operations comprising:
obtaining first network analytics data from a plurality of zones of a telecommunication network;
generating a set of policies from the first network analytics data via a machine-learning algorithm, wherein each policy in the set of policies comprises a pattern matching rule;
deploying at least one policy of the set of policies to a plurality of edge devices in respective zones of the plurality of zones of the telecommunication network;
receiving, from at least one of the plurality of edge devices in one of the plurality of zones, a first alert of a first policy trigger of a first policy of the set of policies; and
transmitting a notification to a software defined network controller of the first policy trigger.

20. A device comprising:
a processing system including at least one processor; and
a computer-readable medium storing instructions which, when executed by the processing system, cause the processing system to perform operations, the operations comprising:
obtaining first network analytics data from a plurality of zones of a telecommunication network;
generating a set of policies from the first network analytics data via a machine-learning algorithm, wherein each policy in the set of policies comprises a pattern matching rule;
deploying at least one policy of the set of policies to a plurality of edge devices in respective zones of the plurality of zones of the telecommunication network;
receiving, from at least one of the plurality of edge devices in one of the plurality of zones, a first alert of a first policy trigger of a first policy of the set of policies; and
transmitting a notification to a software defined network controller of the first policy trigger.

* * * * *